(12) United States Patent
Goto et al.

(10) Patent No.: US 6,925,236 B2
(45) Date of Patent: Aug. 2, 2005

(54) BROADBAND OPTICAL SPECTRUM GENERATING APPARATUS AND PULSED LIGHT GENERATING APPARATUS

(75) Inventors: Toshio Goto, Aichi-ken (JP); Norihiko Nishizawa, Aichi-ken (JP); Youta Ito, Mie-ken (JP)

(73) Assignees: Nagoya Industrial Science Research Institute, Aichi (JP); Aisin Seiki Kabushiki Kaisha, Aichi-ken (JP)

( * ) Notice: Subject to any disclaimer, the term of this patent is extended or adjusted under 35 U.S.C. 154(b) by 384 days.

(21) Appl. No.: 10/231,131

(22) Filed: Aug. 30, 2002

(65) Prior Publication Data

US 2004/0042511 A1 Mar. 4, 2004

(51) Int. Cl.[7] .................................................. G02B 6/00
(52) U.S. Cl. ....................... 385/122; 359/240
(58) Field of Search ..................... 385/24, 122, 125; 359/240

(56) References Cited

U.S. PATENT DOCUMENTS 6,097,870 A * 8/2000 Ranka et al. ............... 385/127
2004/0234216 A1 * 11/2004 Okuno et al. ............... 385/122

FOREIGN PATENT DOCUMENTS

| JP | HEI 8-234249 | 9/1996 |
| JP | HEI 10-90737 | 4/1998 |
| JP | HEI 11-160744 | 6/1999 |
| JP | HEI 11-174503 | 7/1999 |

OTHER PUBLICATIONS

21st Annual Meeting of the Laser Society of Japan, Digest of Technical Papers, Jan. 30–31, 2001.
Extended Abstracts (The 61st Autumn Meeting, 2000) The Japan Society of Applied Physics, Sep. 3, 2000.

* cited by examiner

Primary Examiner—Akm Enayet Ullah
Assistant Examiner—Jennifer Doan
(74) Attorney, Agent, or Firm—Sughrue Mion, PLLC

(57) ABSTRACT

A broadband optical spectrum generating apparatus 20 includes a ultrashort pulsed fiber laser 22 that generates pulsed light having a pulse width in the unit of picosecond to femtosecond, and broadband optical spectrum-generating optical fibers 24 that are connected with the ultrashort pulse fiber laser 22 via a lens 26 and have characteristics of normal dispersion, that is, a nonlinear coefficient of not less than 10 $[W^{-1} km^{-1}]$ and a magnitude of wavelength dispersion of not greater than a value 0 [ps/km/nm] with regard to a wavelength of the pulsed light. The resulting output is super continuum that is widely broadened to a wavelength band of 1400 nm to 1750 nm and is chirped to a linear characteristic.

11 Claims, 12 Drawing Sheets

US 6,925,236 B2

BROADBAND OPTICAL SPECTRUM GENERATING APPARATUS AND PULSED LIGHT GENERATING APPARATUS

BACKGROUND OF THE INVENTION

1. Field of the Invention

The present invention relates to a broadband optical spectrum generating apparatus and a pulsed light generating apparatus. More specifically the invention pertains to a broadband optical spectrum generating apparatus that generates a broadband optical spectrum as well as to a pulsed light generating apparatus that generates pulsed light having a desired wavelength in a predetermined wavelength band.

2. Description of the Prior Art

Widely broadened optical spectra called super continuum have recently drawn attention in the field of optical communication and optical measurement. A diversity of broadband optical spectrum generating apparatuses and techniques have been proposed to utilize optical fibers having nonlinear effects and thereby generate the super continuum (for example, JAPANESE PATENT LAID-OPEN GAZETTE No. 8-234249, No. 10-90737, No. 11-160744, and No. 11-174503).

Optical fibers of several hundred meters or even several kilometers are, however, required in such prior art broadband optical spectrum generating apparatuses and techniques, and are thus unpractical. Multiple amplification stages are required for excitation light, which is used for generation of super continuum. This results in undesirably complicated construction and large size of the apparatus.

The object of the present invention is thus to provide a broadband optical spectrum generating apparatus that generates an easily handled, widely broadened optical spectrum. The object of the present invention is also to attain size reduction and simplified construction of the broadband optical spectrum generating apparatus. The broadband optical spectrum generating apparatus of the invention aims at generating pulsed light of an arbitrary wavelength out of a wide wavelength band.

SUMMARY OF THE INVENTION

In order to achieve at least a part of the aforementioned objects, a broadband optical spectrum generating apparatus and a pulsed light generating apparatus of the present invention are structured as follows.

A broadband optical spectrum generating apparatus of the present invention is a broadband optical spectrum generating apparatus that generates a broadband optical spectrum, the apparatus including:

a pulsed light source that outputs pulsed light having a pulsed width in a unit of picosecond to femtosecond; and spectrum generating optical fibers that have characteristics of normal dispersion, that is, a nonlinear coefficient of not less than 10 ($W^{-1}$ $km^-$) and a magnitude of wavelength dispersion of not greater than a value 0 (ps/km/nm) with regard to a wavelength of the pulsed light generated by the pulsed light source, are adjusted to have a length in a range of 1 (m) to 10 (m), and convert the pulsed light input from the pulsed light source into a broadband optical spectrum.

The broadband optical spectrum generating apparatus of the present invention uses the spectrum generating optical fibers that have the characteristics of normal dispersion, that is, the nonlinear coefficient of not less than 10 ($W^{-1}$ $km^{-1}$) and the magnitude of wavelength dispersion of not greater than the value 0 (ps/km/nm), and that are adjusted to have the length in the range of 1 (m) to 10 (m). This ensures generation of the broadband optical spectrum and makes a linear relationship between the wavelength of the optical spectrum and the time of appearance of the optical spectrum. Namely this enables generation of the broadband optical spectrum that is chirped to a linear characteristic. This arrangement facilitates the subsequent processing including a series of processing in the course of extracting an optical spectrum of an arbitrary wavelength. The apparatus of the invention uses a single pulsed light source. This attains size reduction and simplified construction of the apparatus.

In the broadband optical spectrum generating apparatus of the invention, it is preferable that the pulsed light output from the pulsed light source has a central wavelength of about 1556 (nm), a pulse width in a range of 10 through 1000 femtoseconds, and a peak intensity of not less than 1 (kW). It is also preferable that the spectrum generating optical fibers are characterized by a magnitude of wavelength dispersion around −10 (ps/km/nm) and a nonlinear coefficient around 15 ($W^{-1}$ $km^{-1}$). The preferable spectrum generating optical fibers are of a polarization maintaining type and have a length of 5 (m). The optical spectrum tends to be more widely broadened with the narrower pulse width, the greater peak intensity, the higher nonlinearity, and the smaller magnitude of wavelength dispersion. When the pulse width and the magnitude of wavelength dispersion are fixed, the optical spectrum is determined by the product of the peak intensity and the nonlinear coefficient.

In the broadband optical spectrum generating apparatus of the invention, there may be provided with pulse compressing optical fibers that have characteristics of abnormal dispersion with regard to the wavelength of the pulsed light generated by the pulsed light source, and compress a time width of the pulsed light output from the pulsed light source to output the time width-compressed pulsed light to the spectrum generating optical fibers. This arrangement compresses the time width of the pulsed light input into the spectrum generating optical fibers. This effectively shortens the time of appearance of the optical spectrum in a whole wavelength domain while maintaining the linearity of the optical spectrum. Here, it is preferable that the pulse compressing optical fibers are characterized by a nonlinear coefficient in a range of 2 to 10 ($W^{-1}$ $km^{-1}$) and by a magnitude of wavelength dispersion of not less than a value 4 (ps/km/nm) and have a length in a range of 10 to 50 (cm). The length of the pulse compressing optical fibers tends to be shortened with the higher peak intensity of the input pulsed light and to be elongated with the wider pulse width.

A pulsed light generating apparatus of the invention is a pulsed light generating apparatus that generates pulsed light of a desired wavelength out of a predetermined wavelength band, the apparatus including:

a pulsed light source that outputs pulsed light having a pulsed width in a unit of picosecond to femtosecond;

spectrum generating optical fibers that have characteristics of normal dispersion, that is, a nonlinear coefficient of not less than 10 ($W^{-1}$ $km^{-1}$) and a magnitude of wavelength dispersion of not greater than a value 0 (ps/km/nm) with regard to a wavelength of the pulsed light generated by the pulsed light source, are adjusted to have a length in a range of 1 (m) to 10 (m), and convert the pulsed light input from the pulsed light source into a broadband optical spectrum;

a wavelength tunable filter that allows transmission of an optical spectrum of an arbitrary wavelength out of the broadband optical spectrum output from the spectrum generating optical fibers; and a wavelength selector that selects a wavelength of the optical spectrum transmitting through the wavelength tunable filter, in response to an electric signal.

In the pulsed light generating apparatus of the present invention, the pulsed light source and the spectrum generating optical fibers function to generate the broadband optical spectrum. The wavelength selector selects the wavelength of the optical spectrum. The wavelength tunable filter allows transmission of the optical spectrum of the selected wavelength. The optical spectrum of an arbitrary wavelength is accordingly extracted. Namely this arrangement ensures generation of the optical spectrum or the pulsed light of a desired wavelength out of a broad wavelength band.

In the pulsed light generating apparatus of the invention structured in this way, it is preferable that the wavelength tunable filter is an acousto-optic wavelength tunable filter and the pulsed light source outputs pulsed light having a central wavelength of about 1556 (nm), a pulse width in a range of 10 to 1000 femtoseconds, and a peak intensity of not less than 1 (kW). It is also preferable that the spectrum generating optical fibers are characterized by a nonlinear coefficient around 15 ($W^{-1}$ $km^{-1}$) and a magnitude of wavelength dispersion around −10 (ps/km/nm) and have a length of approximately 5 (m).

Moreover, in the pulsed light generating apparatus of the invention, there may be provided with pulse compressing optical fibers that have characteristics of abnormal dispersion with regard to the wavelength of the pulsed light generated by the pulsed light source, and compress a time width of the pulsed light output from the pulsed light source to output the time width-compressed pulsed light to the spectrum generating optical fibers. This arrangement compresses the time width of the pulsed light input into the spectrum generating optical fibers. This effectively shortens the time of appearance of the optical spectrum in a whole wavelength domain while maintaining the linearity of the optical spectrum. Here, it is preferable that the pulse compressing optical fibers are characterized by a nonlinear coefficient in a range of 2 to 10 ($W^{-1}$ $km^{-1}$) and by a magnitude of wavelength dispersion of not less than a value 4 (ps/km/nm) and have a length in a range of 10 to 50 (cm).

DESCRIPTION OF THE PREFERRED EMBODIMENTS

Figure 1:
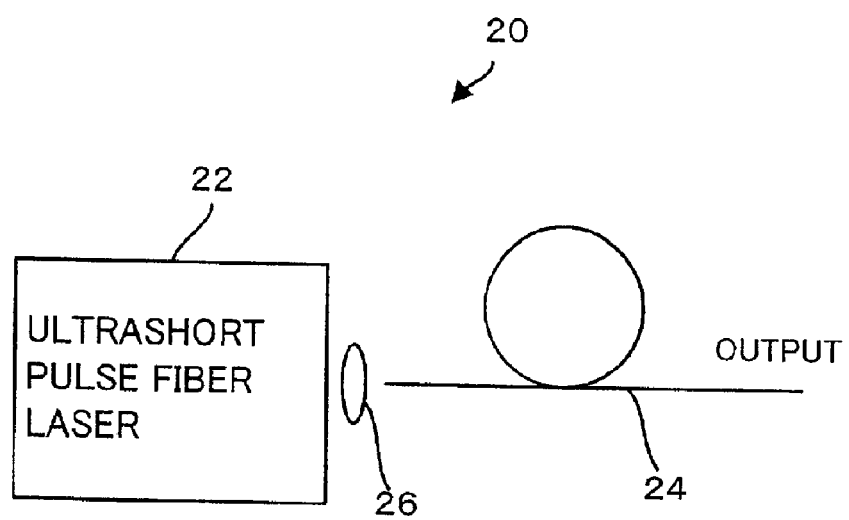
FIG. 1 schematically illustrates the construction of a broadband optical spectrum generating apparatus 20 in one embodiment of the present invention.

The following describes preferred embodiments of the present invention. FIG. 1 schematically illustrates the construction of a broadband optical spectrum generating apparatus 20 in one embodiment of the present invention. The broadband optical spectrum generating apparatus 20 of the embodiment includes a ultrashort pulse fiber laser 22 that generates pulsed light having a pulse width in the unit of picosecond to femtosecond, and broadband optical spectrum-generating optical fibers 24 that are connected with the ultrashort pulse fiber laser 22 via a lens 26 to convert the pulsed width output from the ultrashort pulse fiber laser 22 into a broadband optical spectrum.

The ultrashort pulse fiber laser 22 used in the embodiment stably outputs ultrashort pulsed light having a pulse width of 110 femtoseconds (fs), a central wavelength of 1556 (nm), a frequency of 50 (MHz), and a mean output of 60 (mW). The pulsed light output from the ultrashort pulse fiber laser 22 preferably has the narrower pulse width and the higher peak intensity. The high peak intensity of the output pulsed light ensures the favorable results even under the condition of the wide pulse width, based on the relationship between the pulse width and the peak intensity of the output pulsed light. The preferable range of the pulse width is 10 to 1000 femtoseconds, and the preferable range of the peak intensity is not less than 1 (kW).

Optical fibers of highly nonlinear normal dispersion shifted type are preferably applied for the broadband optical spectrum-generating optical fibers 24. The preferable optical fibers are characterized by a nonlinear coefficient of not greater than 10 ($W^{-1}$ $km^{-1}$) and a magnitude of wavelength dispersion of not greater than a value 0 (ps/km/nm) with regard to a wavelength of the input pulsed light. Polarization maintaining optical fibers are preferable, although non-polarization maintaining type is usable. The broadband optical spectrum-generating optical fibers 24 used in this embodiment are polarization maintaining highly nonlinear normal dispersion shifted fibers having an adjusted length of 3 m and a mode field diameter of 3.5 μm, a nonlinear coefficient of 15 ($W^{-1}$ $km^{-1}$)m and a magnitude of wavelength dispersion equal to −12.7 (ps/km/nm) with regard to a wavelength 1.55 μm of the input pulsed light. For example, in the case of silica glass optical fibers, the nonlinearity is enhanced with the smaller cross sectional area of light propagation and the greater quantity of germanium dioxide ($GeO_2$) added to the core. The nonlinearity is thus adjusted by regulating the cross sectional area of light propagation and the quantity of the additive in the case of the polarization maintaining highly nonlinear dispersion shifted fibers. The broadband optical spectrum-generating optical fibers 24 of the embodiment may be produced by a typical manufacturing method of optical fibers.

The lens 26 used in this embodiment has a diameter of 2 (mm) and a focal distance of 2 (mm) and enables the pulsed light from the ultrashort pulse fiber laser 22 to enter the broad optical spectrum-generating optical fibers 24. The output end of the pulsed light from the ultrashort pulse fiber laser 22 is the optical fibers. The lens 26 may be omitted when the output end of the ultrashort pulse fiber laser 22 is directly connected to the broadband optical spectrum-generating optical fibers 24.

Figure 2:
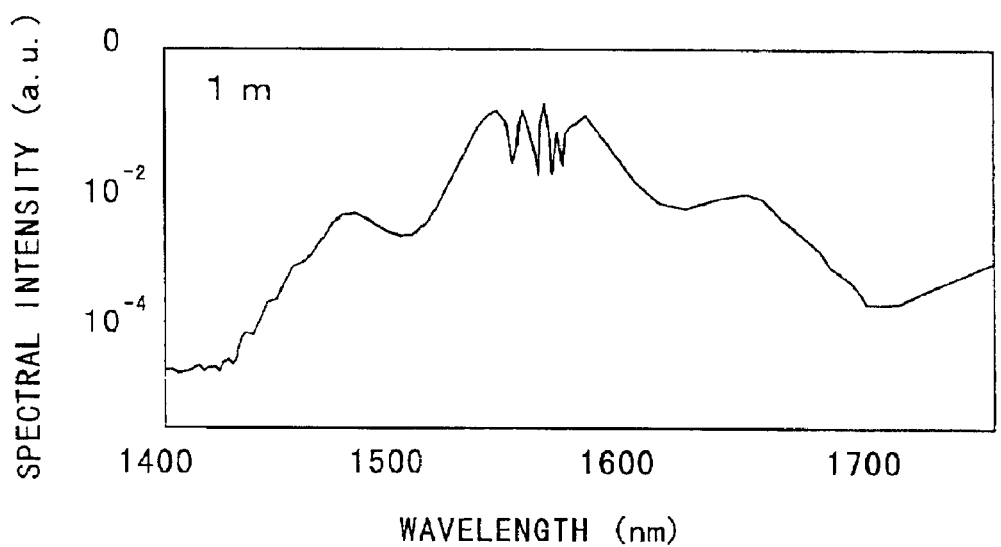
FIG. 2 is a graph showing an observed output spectrum from broadband optical spectrum-generating optical fibers 24 having a fiber length of 1 (m)
Figure 3:
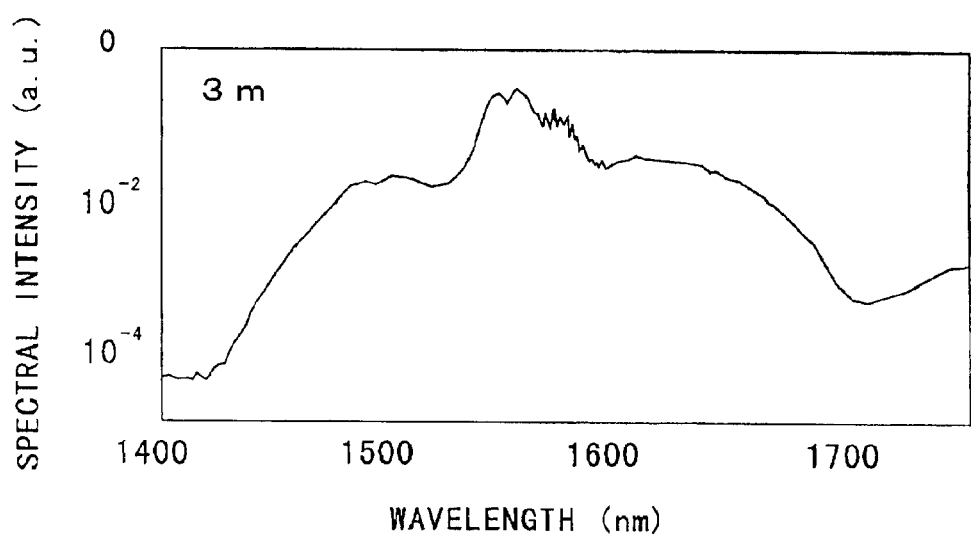
FIG. 3 is a graph showing an observed output spectrum from broadband optical spectrum-generating optical fibers 24 having a fiber length of 3 (m)
Figure 4:
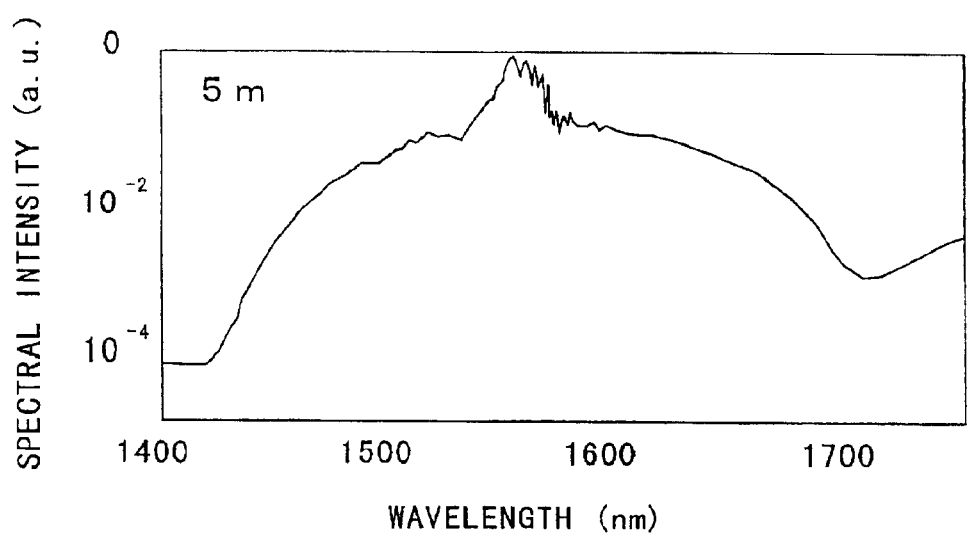
FIG. 4 is a graph showing an observed output spectrum from broadband optical spectrum-generating optical fibers 24 having a fiber length of 5 (m)
Figure 5:
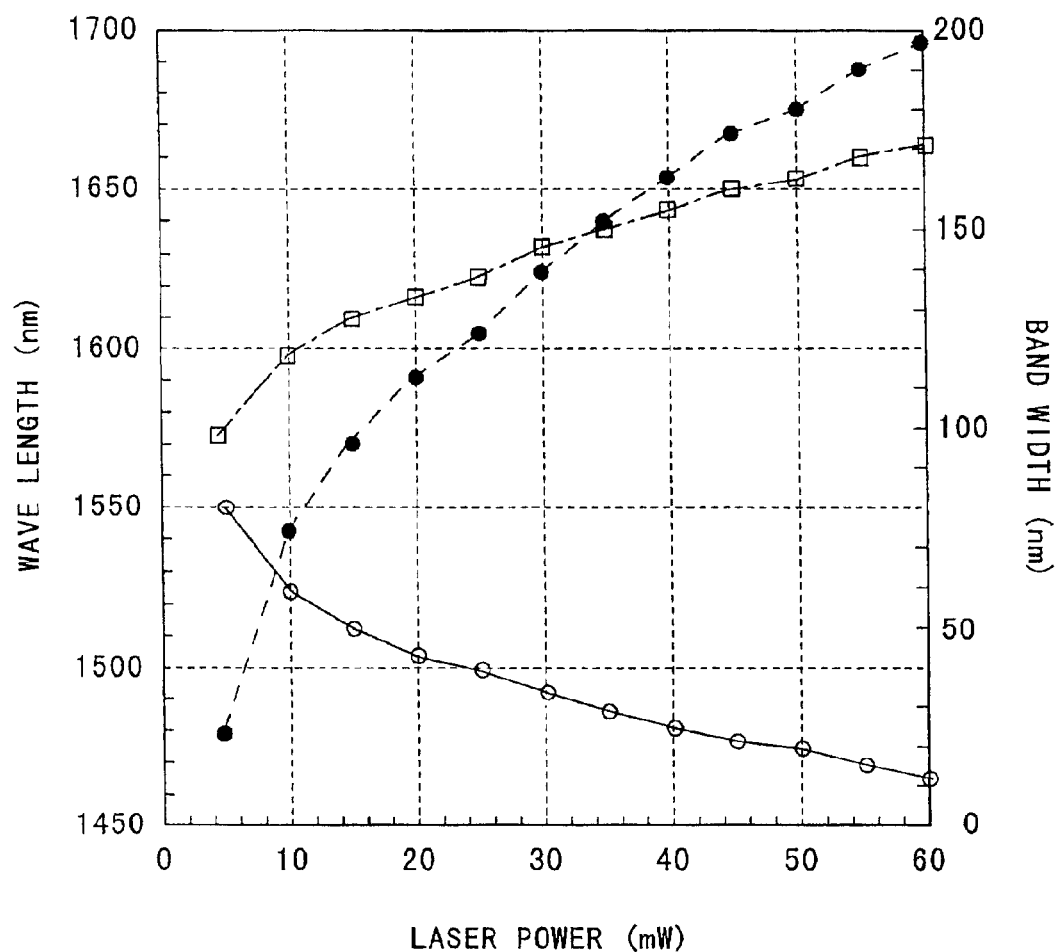
FIG. 5 is a graph showing variations in wavelength of the observed output spectra from the broadband optical spectrum-generating optical fibers 24 plotted against the output of a ultrashort pulse fiber laser 22.

The broadband optical spectrum generating apparatus 20 of the embodiment thus constructed has the following features. FIGS. 2 through 4 are graphs showing observed output spectra from the broadband optical spectrum-generating optical fibers 24, when pulsed light having a mean output of 30 (mW), a pulse width of 110 (fs), and an energy level of 625 (pJ) per pulse is input from the ultrashort pulse fiber laser 22 into the broadband optical spectrum-generating optical fibers 24 of diverse fiber lengths. As shown in the graphs of FIGS. 2 through 4 with regard to the fiber length of 1 (m) to 5 (m), super continuum widely broadened in a wavelength band of 1400 (nm) to 1750 (nm). No experiment was specifically performed with regard to optical fibers having a fiber length of greater than 5 (m). Such experiments are, however, not required, since it is empirically known that the greater fiber length gives the more favorable super continuum. The optical spectrum tends to be more widely broadened with the narrower pulse width, the greater peak intensity, the higher nonlinearity, and the smaller magnitude of wavelength dispersion. When the pulse width and the magnitude of wavelength dispersion are fixed, the optical spectrum is determined by the product of the peak intensity and the nonlinear coefficient. FIG. 5 is a graph showing variations in wavelength of the observed output spectra from the broadband optical spectrum-generating optical fibers 24 plotted against the output of the ultrashort pulse fiber laser 22. A curve of solid line with open circles represents a variation in lower limit wavelength of the observed spectra, and a curve of one-dot chain line with open squares represents a variation in upper limit wavelength of the observed spectra. Both plots should be read on the coordinate axis on the left side. A curve of broken line with closed circles represents a variation in difference between the lower limit wavelength and the upper limit wavelength of the observed spectra. This plot should be read on the coordinate axis on the right side. As shown in the graph, practical super continuum is obtained when the ultrashort pulse fiber laser 22 has an output of not less than 10 (mW).

Figure 6:
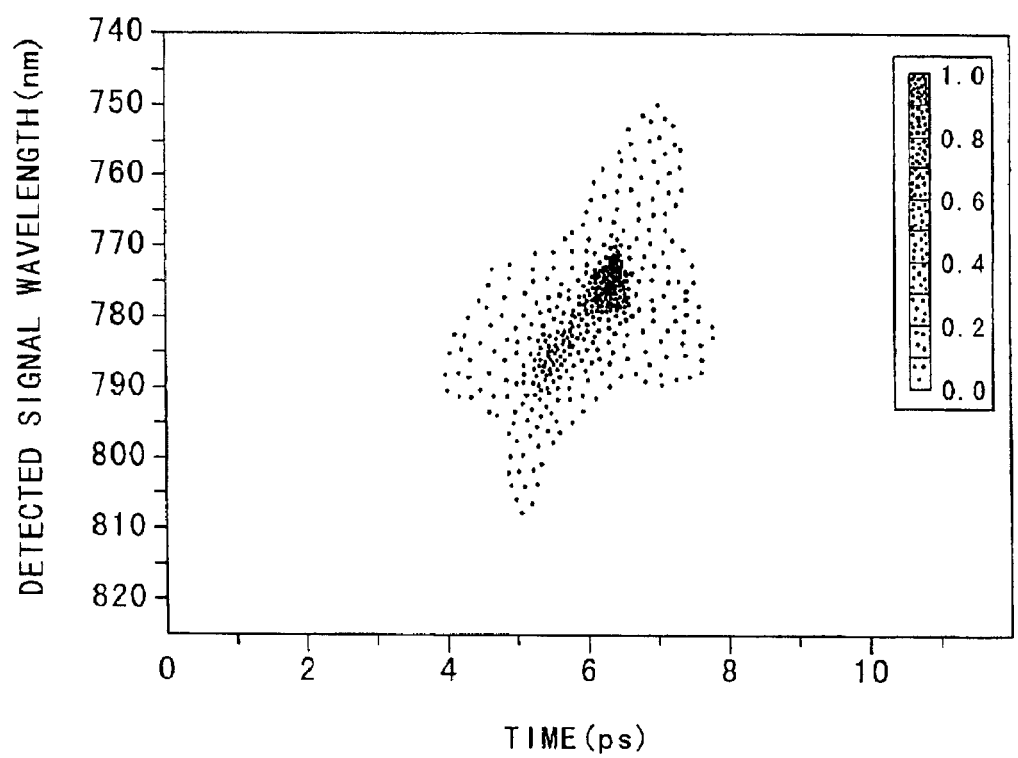
FIG. 6 is a spectrogram showing the relationship between the wavelength of the observed output spectra from the broadband optical spectrum-generating optical fibers 24 having the fiber length of 1 (m) and the time of appearance.
Figure 7:
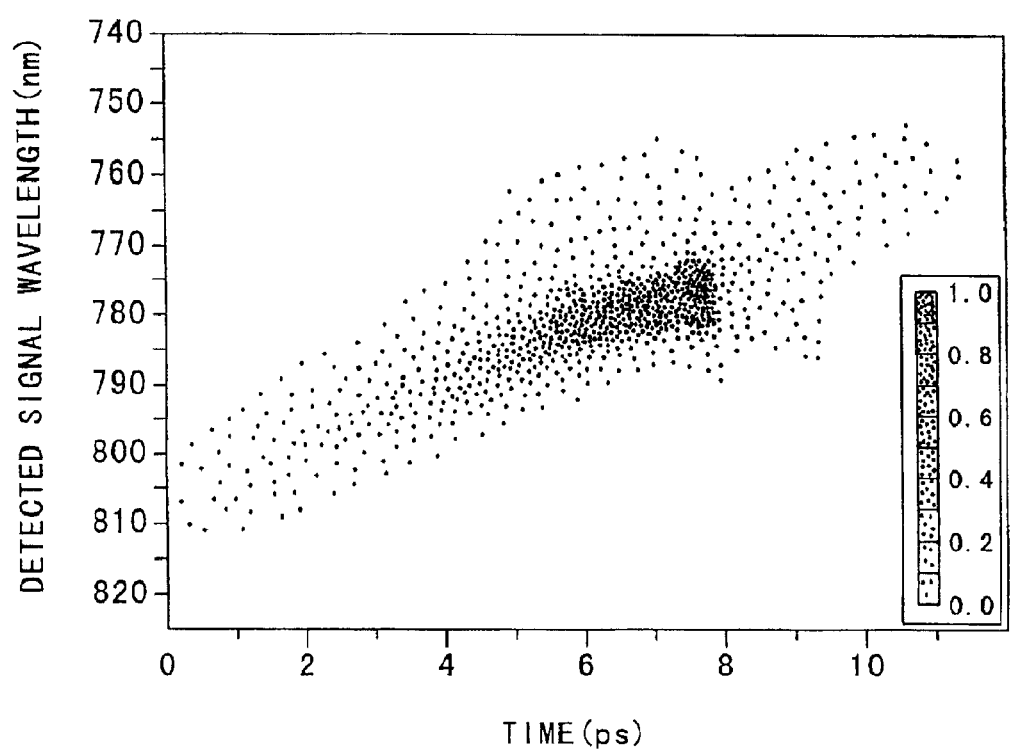
FIG. 7 is a spectrogram showing the relationship between the wavelength of the observed output spectra from the broadband optical spectrum-generating optical fibers 24 having the fiber length of 5 (m) and the time of appearance.
Figure 8:
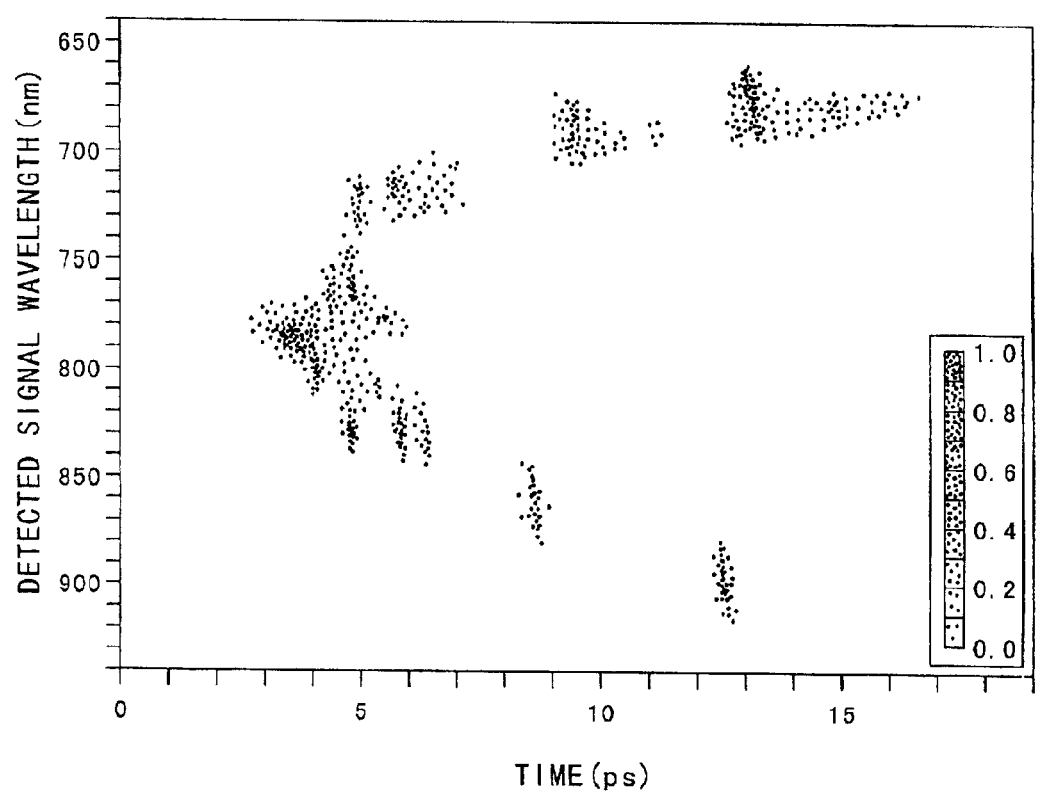
FIG. 8 is a spectrogram showing the relationship between the wavelength of the observed output spectra from broadband optical spectrum-generating optical fibers of a comparative example and the time of appearance.

FIGS. 6 and 7 are spectrograms showing the relationship between the wavelength and the time of appearance of the observed output spectrum from the broadband optical spectrum-generating optical fibers 24 having fiber lengths of 1 m and 5 m under the same conditions as those of FIGS. 2 through 4. FIG. 8 is a spectrogram showing the relationship between the wavelength and the time of appearance of the observed output spectrum from optical fibers of a comparative example, which were used in place of the broadband optical spectrum-generating optical fibers 24, under the same conditions as those of FIGS. 2 through 4. The optical fibers of the comparative example used here are polarization maintaining highly nonlinear dispersion shifted fibers having an adjusted length of 5 (m) and a mode field diameter of 3.5 ($\mu$m), a nonlinear coefficient of 21 ($W^{-1}$ $km^{-1}$), and a magnitude of wavelength dispersion equal to a value 1 (ps/km/nm) with regard to a wavelength 1.55 $\mu$m of the input pulsed light. As shown in the graph of FIG. 8, spectra of significantly different wavelengths appear simultaneously in the comparative example. In the graphs of the embodiment, on the other hand, there are linear relationships between the wavelength and the time of appearance of the spectra. The linearity is affected by the magnitude of wavelength dispersion and the length of the broadband optical spectrum-generating optical fibers 24. The results of the experiment show that the favorable magnitude of wavelength dispersion is about −12.7 (ps/km/nm) and the favorable length is about 5 (m).

The broadband optical spectrum generating apparatus 20 of the embodiment discussed above uses the ultrashort pulse fiber laser 22 that generates the pulsed light having the pulse width in the unit of picosecond to femtosecond, and the broadband optical spectrum generating-optical fibers 24 that are characterized by the nonlinear coefficient of not less than 10 ($W^{-1}$ $km^{-1}$) and the magnitude of wavelength dispersion of not greater than the value 0 (ps/km/nm) with regard to the wavelength of the input pulsed light. This construction accordingly generates the super continuum widely broadened to the wavelength band of 1400 nm to 1750 nm useful for optical communication. The generated broadband optical spectrum is chirped to the linear characteristic and has the linear relationship between the wavelength and the time of appearance of the spectrum. This feature desirably simplifies subsequent processing including a series of processing in the course of extracting an optical spectrum of an arbitrary wavelength.

The broadband optical spectrum generating apparatus 20 of the embodiment uses the single ultrashort pulse fiber laser 22, thus attaining size reduction and simplified construction of the apparatus. In the broadband optical spectrum generating apparatus 20 of the embodiment, the length of the broadband optical spectrum-generating optical fibers 24 ranges from 1 to 10 m and is preferably about 5 m. Compared with the prior art apparatus using the optical fibers of several hundred meters or even several kilometers, this arrangement attains the effective size reduction.

Figure 9:
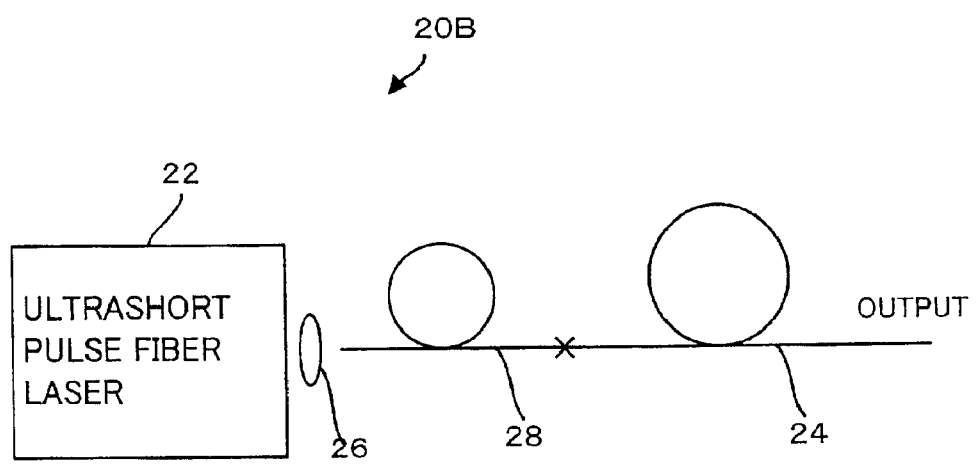
FIG. 9 schematically illustrates the construction of a broadband optical spectrum generating apparatus 20B in a second embodiment.

The following describes a broadband optical spectrum generating apparatus 20B in a second embodiment of the present invention. FIG. 9 schematically illustrates the construction of the broadband optical spectrum generating apparatus 20B of the second embodiment. The broadband optical spectrum generating apparatus 20B of the second embodiment has pulse compressing optical fibers 28 for compressing the time width of the pulsed light output from the ultrashort pulse fiber laser 22, which is located before the broadband optical spectrum-generating optical fibers 24, in addition to the structure of the broadband optical spectrum generating apparatus 20 of the first embodiment. The other constituents of the broadband optical spectrum generating apparatus 20B of the second embodiment, that is, the ultrashort pulse fiber laser 22, the broadband optical spectrum-generating optical fibers 24, and the lens 26, are described in the first embodiment and thus not specifically discussed here again.

Optical fibers having abnormal dispersion characteristics are preferably applied for the pulse compressing optical fibers 28 included in the broadband optical spectrum generating apparatus 20B of the second embodiment. The preferable characteristics include a nonlinear coefficient in a range of 2 to 10 ($W^{-1}$ $km^{-1}$) and a magnitude of wavelength dispersion of not less than a value 4 (ps/km/nm) with regard to a wavelength of the input pulsed light, and a length of 10 to 50 (cm). The optical fibers used in the second embodiment are characterized by a nonlinear coefficient of 4.3 ($W^{-1}$ $km^{-1}$), a magnitude of wavelength dispersion equal to a value 12 (ps/km/nm), and a length of 16 (cm).

Figure 10:
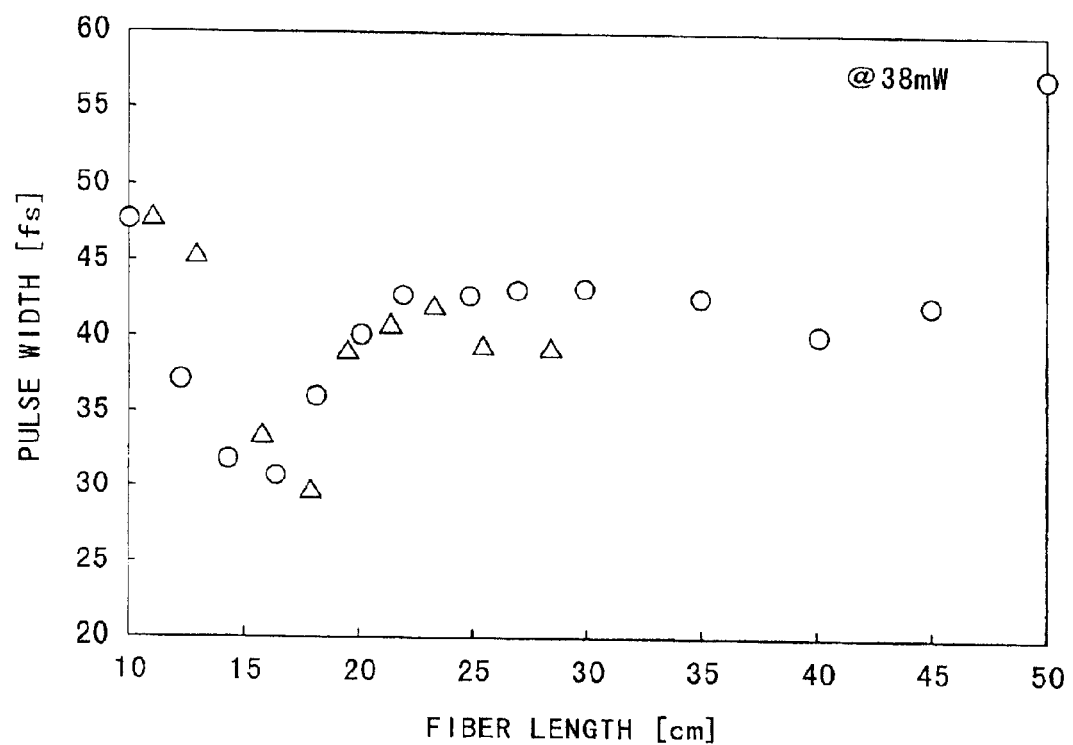
FIG. 10 is a graph showing the width of the output pulse plotted against the length of pulse compressing optical fibers 28 in one experiment.
Figure 11:
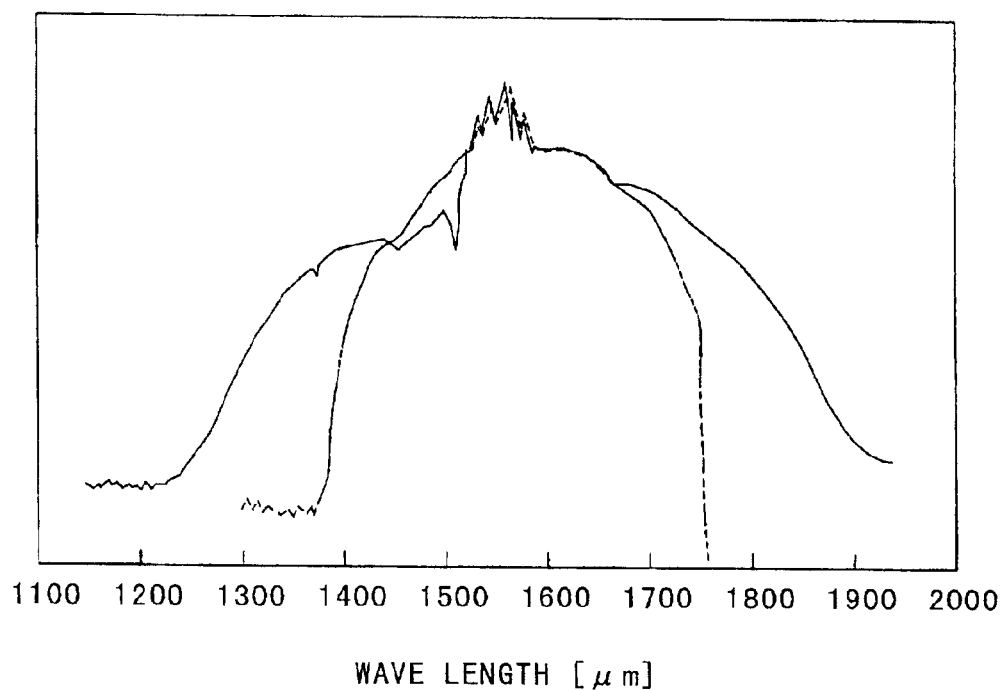
FIG. 11 is a graph showing an observed output spectrum from pulse compressing optical fibers 28 having a fiber length of 16 (cm)

The broadband optical spectrum generating apparatus 20B of the second embodiment thus constructed has the following characteristics. FIG. 10 is a graph showing the width of the output pulse plotted against the length of the pulse compressing optical fibers 28 in one experiment. In the experiment, a pulse having a pulse width of 100 (fs) was output from the ultrashort pulse fiber laser 22 with a laser output of 60 (mW) and a fiber coupling light intensity of 38 (mW). The length of the pulse compressing optical fibers 28 was varied in a range of 10 to 50 (cm). As shown in the graph, the pulse width was not greater than 50 (fs) against any fiber length. The minimum pulse width was observed in the case of the pulse compressing optical fibers 28 having a length of 15 to 17 (cm). FIG. 11 shows super continuum output from the broadband optical spectrum-generating optical fibers 24 included in the broadband optical spectrum generating apparatus 20B of the second embodiment, when the pulse compressing optical fibers 28 used have a length of 16 (cm). Super continuum output from the broadband optical spectrum-generating optical fibers 24 included in the broadband optical spectrum generating apparatus 20 of the first embodiment is also shown in the graph of FIG. 11, for the purpose of comparison. As shown in the graph, the broadband optical spectrum generating apparatus 20B of the second embodiment generates the super continuum widely broadened in a frequency band of 1300 (nm) to 1850 (nm). The length of the pulse compressing optical fibers 28 tends to be shortened with the higher peak intensity of the input pulsed light and elongated with the wider pulse width.

In the broadband optical spectrum generating apparatus 20B of the second embodiment discussed above, the pulse compressing optical fibers 28 for compressing the time width of the pulsed light output from the ultrashort pulse fiber laser 22 is provided before the broadband optical spectrum-generating optical fibers 24. Compared with the structure without the pulse compressing optical fibers 28, this structure generates the more widely broadened super continuum. The structure of the broadband optical spectrum generating apparatus 20B of the second embodiment is identical with that of the broadband optical spectrum generating apparatus 20 of the first embodiment, except the pulse compressing optical fibers 28 provided before the broadband optical spectrum-generating optical fibers 24. Like the broadband optical spectrum generating apparatus 20 of the first embodiment, the second embodiment generates the broadband optical spectrum chirped to the linear characteristic and thereby exerts the effect of facilitating the subsequent processing including the series of processing in the course of extracting an optical spectrum of an arbitrary wavelength. The second embodiment uses the single ultrashort pulse fiber laser 22 and thus exerts the effects of size reduction and simplified construction of the apparatus.

Figure 12:
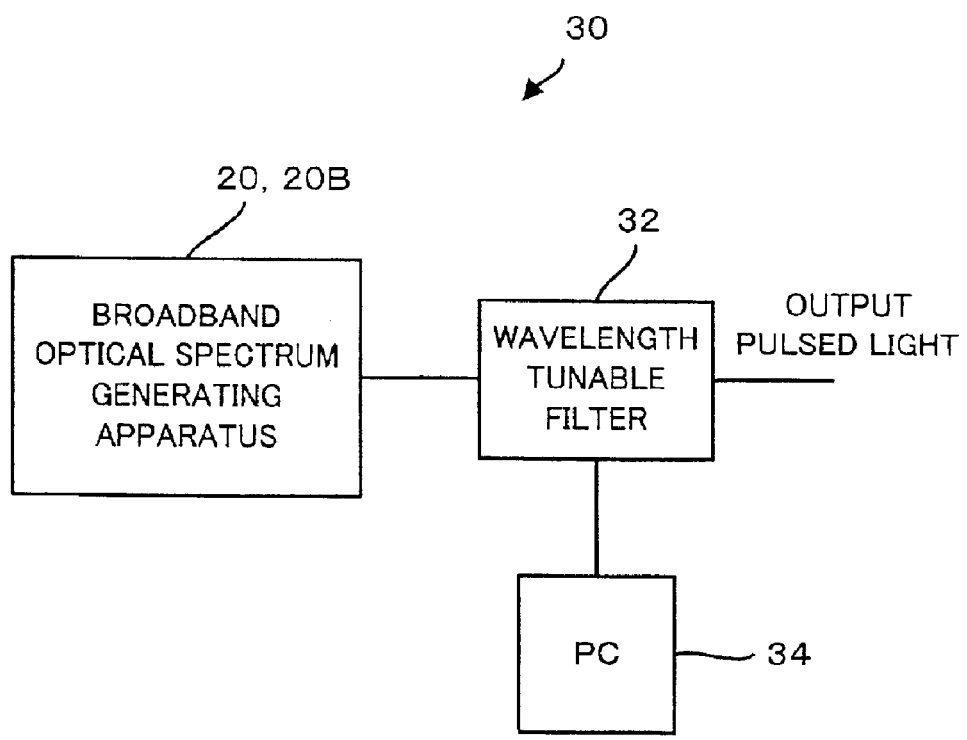
FIG. 12 schematically illustrates the construction of a broadband optical spectrum generating apparatus 30 in one embodiment of the present invention.

The following describes a pulsed light generating apparatus 30 including the broadband optical spectrum generating apparatus 20 of the first embodiment or the broadband optical spectrum generating apparatus 20B of the second embodiment. FIG. 12 schematically illustrates the construction of the pulsed light generating apparatus 30 in one embodiment of the present invention. The pulsed light generating apparatus 30 of the embodiment includes a wavelength tunable filter 32, which is connected to the output of the broadband optical spectrum generating apparatus 20 of the first embodiment or the broadband optical spectrum generating apparatus 20B of the second embodiment and varies a setting of transmission wavelength in response to a driving signal output from a computer 34.

The wavelength tunable filter 32 may utilize, for example, a diffraction grating or a prism as in the case of a spectroscope or an acousto-optic light modulator. The wavelength tunable filter 32 of this embodiment utilizes the acousto-optic light modulator. The acousto-optic light modulator supplies a driving signal to an internal driver, so as to readily vary the transmission wavelength. In the structure of the embodiment, the transmission wavelength set in the wavelength tunable filter 32 is freely adjustable in response to a control signal output from the computer 34 and given to the internal driver of the acousto-optic light modulator.

In the pulsed light generating apparatus 30 thus constructed, the transmission wavelength set in the wavelength tunable filter 32 is regulated with regard to the widely broadened super continuum of 1400 (nm) to 1750 (nm) generated by the broadband optical spectrum generating apparatus 20 of the first embodiment or the widely broadened super continuum of 1300 (nm) to 1850 (nm) generated by the broadband optical spectrum generating apparatus 20B of the second embodiment. This technique ensures output of the pulsed light having a desired wavelength in the band of the resulting super continuum. The computer 34 functions to regulate the transmission wavelength set in the wavelength tunable filter 32. Any desired technique is thus applicable to output the pulsed light of the desired wavelength. An exemplified technique automatically and successively varies the transmission wavelength from the short to the long or from the long to the short in the band of the super continuum.

In the pulsed light generating apparatus 30 of the embodiment, the computer 34 functions to regulate the transmission wavelength set in the wavelength tunable filter 32. One modified application may omit the computer 34 from the pulsed light generation apparatus 30.

The above embodiment is to be considered in all aspects as illustrative and not restrictive. There may be many modifications, change, and alterations without departing from the scope or sprit of the main characteristics of the present invention. All changes within the meaning and range of equivalency of the claims are therefore intended to be embraced therein.

What is claimed is:

1. A broadband optical spectrum generating apparatus that generates a broadband optical spectrum, said apparatus comprising:

a pulsed light source that outputs pulsed light having a pulsed width in a unit of picosecond to femtosecond; and spectrum generating optical fibers that have characteristics of normal dispersion, that is, a nonlinear coefficient of not less than 10 ($W^{-1}$ $km^{-1}$) and a magnitude of wavelength dispersion of not greater than a value 0 (ps/km/nm) with regard to a wavelength of the pulsed light generated by said pulsed light source, are adjusted to have a length in a range of 1 (m) to 10 (m), and convert the pulsed light input from said pulsed light source into a broadband optical spectrum.

2. A broadband optical spectrum generating apparatus in accordance with claim 1, wherein said pulsed light source outputs pulsed light having a central wavelength of about 1556 (nm).

3. A broadband optical spectrum generating apparatus in accordance with claim 2, wherein said pulsed light source outputs pulsed light having a pulse width of 10 through 1000 femtoseconds.

4. A broadband optical spectrum generating apparatus in accordance with claim 2, wherein said pulsed light source outputs pulsed light having a peak intensity of not less than 1 (kW).

5. A broadband optical spectrum generating apparatus in accordance with claim 1, wherein said spectrum generating optical fibers are characterized by a magnitude of a wavelength dispersion around −10 (ps/km/nm).

6. A broadband optical spectrum generating apparatus in accordance with claim 1, wherein said spectrum generating optical fibers are characterized by a nonlinear coefficient around 15 ($W^{-1}$ $km^{-1}$).

7. A broadband optical spectrum generating apparatus in accordance with claim 1, wherein said spectrum generating optical fibers are of a polarization maintaining type.

8. A broadband optical spectrum generating apparatus in accordance with claim 1, wherein said spectrum generating optical fibers have a length of approximately 5 (m).

9. A broadband optical spectrum generating apparatus in accordance with claim 1, said apparatus further comprising:

pulse compressing optical fibers that have characteristics of abnormal dispersion with regard to the wavelength of the pulsed light generated by said pulsed light source, and compress a time width of the pulsed light output from said pulsed light source to output the time width-compressed pulsed light to said spectrum generating optical fibers.

10. A broadband optical spectrum generating apparatus in accordance with claim 9, wherein said pulse compressing optical fibers are characterized by a nonlinear coefficient in a range of 2 to 10 ($W^{-1}$ $km^{-1}$) and by a magnitude of wavelength dispersion of not less than a value 4 (ps/km/nm).

11. A broadband optical spectrum generating apparatus in accordance with claim 9, wherein said pulse compressing optical fibers have a length in a range of 10 to 50 (cm).

* * * * *